(12) United States Patent
Ramachandra et al.

(10) Patent No.: US 8,514,756 B1
(45) Date of Patent: Aug. 20, 2013

(54) COLLECTIVELY ADDRESSING WIRELESS DEVICES

(75) Inventors: Venkatesh Badakere Ramachandra, San Jose, CA (US); Gazal Sahai, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 309 days.

(21) Appl. No.: 12/905,771

(22) Filed: Oct. 15, 2010

(51) Int. Cl.
*H04B 7/00* (2006.01)

(52) U.S. Cl.
USPC ........................................................ 370/310

(58) Field of Classification Search
USPC ................ 370/310, 328, 340, 390, 431, 432; 709/227, 228, 238
See application file for complete search history.

(56) References Cited

U.S. PATENT DOCUMENTS

| | | | |
|---|---|---|---|
| 7,493,108 B2 * | 2/2009 | Beming et al. | 455/418 |
| 7,596,380 B2 * | 9/2009 | Kim | 455/452.1 |
| 7,680,088 B2 * | 3/2010 | George et al. | 370/338 |
| 7,792,935 B2 * | 9/2010 | Karjanlahti | 709/223 |
| 2007/0136762 A1 * | 6/2007 | Zhang | 725/62 |
| 2007/0197235 A1 * | 8/2007 | Zhang | 455/466 |
| 2009/0129308 A1 * | 5/2009 | Fukui | 370/315 |

OTHER PUBLICATIONS

3GPP TS 24.301, V9.3.0, 3rd Generation Partnership Project; Technical Specification Group Core Network and Terminals; Non-Access Stratum (NAS) protocol for Evolved Packet System (EPS); Stage 3, (Release 9), Jun. 2010, 295 pp.
3GPP TS 29.274, V8.4.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3, (Release 8), Dec. 2009, 141 pp.
3GPP TS 36.300, V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2, (Release 10), Jun. 2010, 183 pp.
3GPP TS 36.322, V9.2.0, 3rd Generation Partnership Project; Technical Specification Group Radio Access Network; Evolved Universal Terrestrial Radio Access (E-UTRA); Radio Link Control (RLC) protocol specification; (Release 9), Jun. 2010, 39 pp.
3GPP TS 36.323, V9.0.0, 3rd Generation Partnership Project; Technical Specification Group Radio Access Network; Evolved Universal Terrestrial Radio Access (E-UTRA); Packet Data Convergence Protocol (PDCP) specification, (Release 9), Dec. 2009, 24 pp.

(Continued)

*Primary Examiner* — Dmitry H Levitan
(74) *Attorney, Agent, or Firm* — Shumaker & Sieffert, P.A.

(57) ABSTRACT

In general, techniques are described for identifying a collection of wireless devices to a mobile network using a single group identity. For example, as described herein, an operator assigns a group identity to a plurality of wireless devices that attach to a mobile network. The mobile network establishes, for the plurality of wireless devices, a single service bearer over the mobile network and associates the single service bearer with the group identity and with a single PDP address for the plurality of wireless devices. The mobile network associates the single service bearer with multiple sub-bearers on a particular interface to replicate service data traffic, destined to the PDP address, to each of the plurality of wireless devices and/or aggregate service data traffic, sourced by the PDP address and issued by any of the plurality of wireless devices, for transport to the packet data network.

31 Claims, 8 Drawing Sheets

(56) References Cited

OTHER PUBLICATIONS

3GPP TS 36.331, V8.6.0, 3rd Generation Partnership Project; Technical Specification Group Radio Access Network; Evolved Universal Terrestrial Radio Access (E-UTRA); Radio Resource Control (RRC); Protocol specification, (Release 8), Jun. 2009, 207 pp.

3GPP TS 36.401, V9.2.0, 3rd Generation Partnership Project; Technical Specification Group Radio Access Network; Evolved Universal Terrestrial Radio Access Network (E-UTRAN); Architecture description (Release 9), Jun. 2010, 19 pp.

3GPP TS 36.413, V8.6.1, 3rd Generation Partnership Project; Technical Specification Group Radio Access Network; Evolved Universal Terrestrial Radio Access Network (E-UTRAN); S1 Application Protocol (S1AP) (Release 8), Jun. 2009, 218 pp.

Zimmerman, "OSI Reference Model—The ISO Model of Architecture for Open Systems Interconnection," IEEE Transaction on Communications, vol. 28, No. 4, Apr. 1980, pp. 425-432.

3GPP TS 23.401 V10.0.0, 3rd Generation Partnership Project; Technical Specification Group Services and System Aspects; General Packet Radio Service (GPRS) enhancements for Evolved Universal Terrestrial Radio Access Network (E-UTRAN) access, (Release 10), Jun. 2010, 261 pp.

\* cited by examiner

COLLECTIVELY ADDRESSING WIRELESS DEVICES

TECHNICAL FIELD

The invention relates to mobile networks and, more specifically, to addressing wireless devices attached to mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile service providers convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile network includes core circuit-switched and packet-switched networks, a backhaul network, and a number of radio access networks. The core packet-switched network for the mobile network establishes logical connections, known as traffic bearers, among the many service nodes on a path between a wireless device and a packet data network (PDN). The service nodes then utilize the traffic bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange subscriber data with application or other servers of the PDNs.

SUMMARY

In general, techniques are described for identifying a collection of wireless devices to a mobile network using a single group identity. Using the single group identity, the mobile network establishes traffic bearers and applies replication techniques to deliver downstream data traffic that is addressed to the collective to each of the wireless devices individually. In addition, the mobile network delivers upstream data traffic sourced by any of the wireless devices using one or more traffic bearers established for the collective.

For example, as described herein, a mobile network operator assigns a group identity to a plurality of wireless devices. When a first one of the wireless devices that is assigned the group identity attaches to the network and requests connectivity to a packet data network, the mobile network signaling devices establish a service bearer, assembled from a number of individual traffic bearers, between the first wireless device and the mobile network gateway to the packet data network. As part of the attachment process, the first wireless device conveys the group identity to the mobile network, which associates the group identity with the service bearer. As additional wireless devices assigned the group identity issue attach requests, the mobile network grafts new radio bearers for these additional wireless devices to the service bearer initially established for the first wireless device by mapping the new radio bearers to the group identity.

The mobile network delivers downstream data traffic received in the service bearer by replicating the downstream data traffic to each radio bearer mapped to the group identity and thus tied to the service bearer. In this way, each of the wireless devices assigned the group identity and attached to the network receives the downstream data traffic. The mobile network aggregates and forwards data traffic sourced by wireless devices assigned the group identity to the packet data network using one or more individual traffic bearers that constitute part of the service bearer.

In one embodiment, the invention is directed to a method comprising the steps of establishing a service bearer, with a mobile network, based at least on a same group identity assigned to each of a plurality of wireless devices. The method further comprises the steps of associating the service bearer to a packet data protocol (PDP) address in the mobile network and assigning the PDP address to each of the plurality of wireless devices. The method further comprises the step of exchanging service data traffic between the plurality of wireless devices and a packet data network using the service bearer.

In another embodiment, the invention is directed to a base station of a mobile network, comprising a context data structure to store associations for a service bearer established by the mobile network based at least on a same group identity assigned to each of a plurality of wireless devices, wherein the associations map the service bearer to sub-bearers terminated by the base station, and wherein the context data structure stores the group identity and a PDP address. The base station further comprises a relay module to relay service data traffic between the plurality of wireless devices and an upstream node of the mobile network using the sub-bearers mapped to the service bearer.

In another embodiment, the invention is directed to a mobility management entity of a mobile network comprising a session setup module to send a message to a serving node to direct the serving node to establish a first bearer over a first interface, wherein the session setup module receives an identifier for the first bearer from the serving node. The mobility management entity further comprises a bearer setup module to send a first message to a base station, wherein the first message comprises the identifier for the first bearer and a group identity for a wireless group that includes a plurality of wireless devices, and wherein the first message directs the base station to associate the identifier for the first bearer with the wireless group.

In another embodiment, the invention is directed to a system. The system comprises a base station comprising a User Equipment (UE) interface to establish data radio bearers with wireless devices, a mobility management entity (MME) interface, and a context data structure to store associations for a service bearer. The system also comprises a plurality of wireless devices, wherein each wireless device in the plurality of wireless devices comprises a group identity shared by each wireless device in the plurality of wireless devices and a base station interface to send the group identity to the base station. The system also comprises a mobility management entity comprising an MME base station interface to receive, from the wireless devices via the base station, attach request messages that includes the group identity. The mobility management entity also includes a serving node interface to receive, from a serving node, a first bearer identifier for a first bearer over a first interface between the serving node and the base station. The mobility management entity also includes a bearer setup module to send, to the base station, context setup messages that include the first bearer identifier and a UE identifier for respective wireless devices, wherein the MME interface receives context setup messages and associates, in the context data structure, the service bearer, the first bearer identifier and data radio bearers for each of the plurality of wireless devices.

In another embodiment, the invention is directed to a wireless group comprising a plurality of wireless devices, each of the wireless devices comprising a PDP address and a group identity for the wireless group. Each of the wireless devices additionally comprises a context data structure to map a service bearer for the wireless group to the PDP address. Each of the wireless devices also comprises a base station interface to send the group identity to a base station that serves the wireless group, wherein the base station interface establishes a data radio bearer for the service bearer with the base station.

The described techniques may provide one or more advantages. For example, collectively addressing a group of wireless devices may reduce allocation of both IP addresses and International Mobile Subscriber Identities (IMSIs) from exhaustible namespaces, thus conserving these resources. In addition, collective addressing may in some instances reduce an amount of subscriber traffic on a path from a server to wireless devices by allowing the server to issue one communication while the mobile network replicates the communication downstream to the wireless devices associated with the group identity. Such replication and aggregation at serving nodes of the mobile network, made possible by collective addressing, may also reduce resource utilization in the mobile network by allowing the serving nodes to reuse core traffic bearers for multiple wireless devices.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
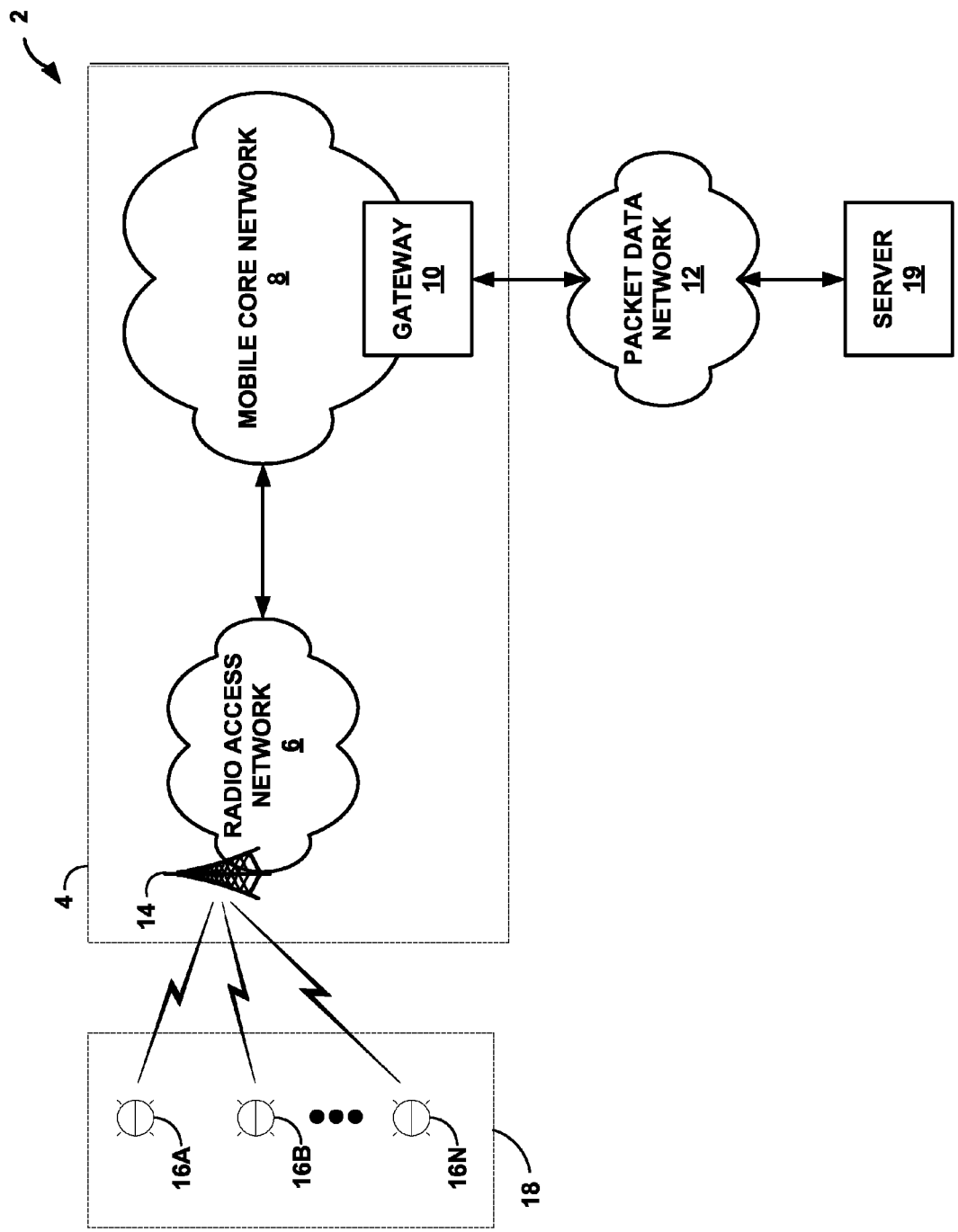
FIG. 1 is a block diagram illustrating an example network system that performs collective addressing and packet transport according to the described techniques.

FIG. 1 is a block diagram illustrating an example network system 2 that performs collective addressing according to the described techniques. In this example, network system 2 comprises packet data network (PDN) 12 coupled to server 19 and to mobile service provider network 4. Packet data network 12 supports one or more packet-based services provided by server 19 that are available for request and use by any of wireless devices 16A-16N ("wireless devices 16") collectively addressable, in accordance with the techniques herein described, as wireless group 18. As examples, PDN 12 in conjunction with server 19 may provide, for example, bulk data delivery, voice over Internet protocol (VoIP), Internet protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates mobile service provider network 4, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet transport for server 19 services.

Each of wireless devices 16 is a wireless communication device that may comprise, for example, a utility meter, a security device such as a motion detector or door lock, a light, a mobile telephone, a laptop or desktop computer having, e.g., a 3G wireless card, a wireless-capable netbook, a video game device, a pager, a smart phone, or a personal data assistant (PDA). Each of wireless devices 16 may run one or more applications, such as metering applications, listeners, mobile calls, video games, videoconferencing, and email, among others. Certain applications running on wireless devices 16 may require access to services offered by server 19 via PDN 12. Wireless devices 16 may also be referred to, in various architectural embodiments, as User Equipment (UE) or Mobile Stations (MS).

A service provider operates mobile service provider network 4 to provide network access, data transport and other services to wireless devices 16. In general, mobile service provider network 4 may commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum. For example, mobile service provider network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Mobile service provider network 4 may, alternatively or in conjunction with one of the above, implement a code division multiple access-2000 ("CDMA2000") architecture. Mobile service provider network 4 may, again as an alternative or in conjunction with one or more of the above, implement a WiMAX architecture defined by the WiMAX forum.

Mobile service provider network 4 comprises mobile core network 8 and radio access network 6. Wireless devices 16 communicate using wireless links to base station 14 of radio access network 6 to access mobile service provider network 4. Mobile service provider network 4 may, in some embodiments, include multiple radio access network coupled to mobile core network 8.

Mobile core network 8 and radio access network 6 may communicate over a backhaul network (not shown) that includes land-based transmission lines, frequently leased by a service provider for mobile service provider network, to transport mobile data and control traffic between base station 4 and the gateway 10. The backhaul network also includes network devices such as aggregation devices and routers.

Mobile core network 8 provides session management, mobility management, and transport services between radio access network 6 and PDN 12 to support access, by wireless devices 16, to PDN 12 and services of server 19. Mobile core network 8 is coupled to PDN 12 via a communication link. Mobile core network 8 may comprise, for instance, a general packet radio service (GPRS) core packed-switched network, a GPRS core circuit-switched network, an IP-based mobile multimedia core network, or an Evolved Packet Core (EPC). Mobile core network 8 comprises one or more packet processing nodes to support firewall, load balancing, billing, deep-packet inspection (DPI), and other services for mobile traffic traversing the mobile core network. Gateway 10 operates as a gateway to PDN 12 and may comprise, for example, a Gateway GPRS Serving Node (GGSN), an Access Gateway (aGW), or a Packet Gateway (P-GW).

Radio access network 6 connects wireless devices 16 to mobile core network 8 and provides access control, packet routing and transfer, mobility management, security, radio resource management, and network management. Radio access network 6 may comprise, for example, a GSM Radio Access Network (GRAN), a WiMAX radio access network, a UMTS Radio Access Network (UTRAN), or an evolution of a UTRAN known as an E-UTRAN. Base station 14 may comprise a Node B, an evolved Node B (or "eNodeB"), or wireless access point, for example. Other embodiments of radio access network 6 may include additional base stations, as well as intermediate devices such as radio network controllers (RNCs).

Mobile core network 8, radio access network 6, and wireless devices 16 cooperate to establish and operate traffic bearers that, in combination, constitute one or more service bearers to transport user service traffic, in the form of PDP packet data units (PDUs), between wireless devices 16 and PDN 12. A traffic bearer is a set of network resources and data transport functions in mobile service provider network 4 to deliver user traffic between two network entities. A traffic bearer may include a path, a logical connection, or a physical or wireless connection between two network devices. A service bearer is a traffic bearer assembled from shorter traffic bearers, or "sub-bearers," to provide a PDP bearer service. For example, a particular service bearer between wireless device 16A and PDN 12 may be operated according to session data and various protocols executing on wireless device 16A, elements of radio access network 6, and elements of mobile core network 8. Constituent devices of mobile service provider network 4 concatenate multiple traffic bearers to form the service bearer between wireless device 16A and PDN 12. The service bearer is the logical connection between wireless device 16A and a gateway for mobile service provider network 4 that peers to PDN 12. The service bearer may include an external traffic bearer that carries PDUs from the gateway for mobile service provider network 4 to PDN 12.

While described herein with respect to one or more particular architectures for ease of illustration purposes, mobile service provider network 4 may implement any architecture both those set forth by any standards body and those proprietarily owned. Moreover, the techniques may apply to any mobile data protocol supported by these architectures. The techniques therefore should not be limited to cellular architecture referenced herein and the mobile data protocols supported by these architectures. Gateway 10 and other elements of mobile core network 8, as well as base station 14 and other elements of radio access network 6 may, therefore, each represent an abstraction of devices found within any one of the above mobile network architectures.

In accordance with the techniques of this disclosure, an administrator or other entity assigns a group identity to wireless group 18 consisting of wireless devices 16. That is, the administrator associates the group identity with each of wireless devices 16. The group identity is a string or numerical value that uniquely identifies a group, or set, of one or more wireless devices that may attach to mobile service provider network 4 as a group. In some embodiments, the group identity is a 32-bit integer. Each of wireless devices 16 may store the group identity in a subscriber identity module (SIM) or other non-transitory computer-readable medium of the wireless device. In some embodiments, base station 14 or another element of mobile service provider network 4 stores a group identity for assignation to wireless devices. For example, base station 14 may assign a group identity to any wireless device, e.g., wireless devices 16, that establishes a radio link with base station 14. As another example, base station 14 may store a mapping of wireless device identities to a group identity such that, when a wireless device connects to base station 14 using a mapped wireless device identity, base station 14 assigns the group identity to the wireless device. The wireless device identity may represent, for example, an International Mobile Subscriber Identity (IMSI), a Temporary Mobile Subscriber Identity (TMSI), a P-TMSI, a System Architecture Evolution (SAE) TMSI or S-TMSI, or an International Mobile Equipment Identity (IMEI).

Mobile service provider network 4 establishes traffic bearers, upstream from base station 14, for the group identity for wireless group 18. As individual wireless devices 16 attach to mobile service provider network 4, the mobile service provider network associates traffic bearers for the individual wireless devices 16 with the traffic bearers established for the group identity such that the separate traffic bearers for multiple wireless devices 16 utilize the same upstream traffic bearers for service traffic. In this way, a single service bearer for wireless group 18 nevertheless extends to multiple wireless devices 16. Further details regarding the attach procedure for attaching a wireless device to a mobile service provider are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, the entire contents of which are incorporated herein by reference.

Base station 14 uses the group identity to identify radio bearers for a service bearer mapped to an upstream traffic bearer established for the group identity. As downstream service traffic arrives at base station 14 from an upstream traffic bearer for the group identity, base station 14 replicates the service traffic and outputs replicated service traffic to each of the radio bearers mapped to the upstream traffic bearer. When base station 14 receives upstream traffic from one of wireless devices 16 in a radio bearer mapped to the upstream traffic bearer, base station 14 outputs the upstream traffic to the upstream traffic bearer for transport to packet data network 12. Base station 14 may associate radio bearers with the group identity by, for example, mapping respective TMSIs for wireless devices 16 to the group identity, mapping Packet Data Convergence Protocol (PDCP) entities to the group identity, and mapping radio bearer identifiers (RB IDs) to the group identity. In some embodiments, base station 14 associates radio bearers with identifiers for the upstream traffic bearers established for the group identity. Further details regarding a bearer architecture for mobile network are found in "3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of which are incorporated herein by reference.

Because traffic replication occurs at a downstream location (i.e., base station 14), the techniques may remove a requirement of individual wireless identifiers during establishment, by mobile service provider network 4, of the upstream traffic bearers for the group identity. For example, an administrator or other entity may assign a single IMSI or single unicast PDP address to each of wireless devices 16 of wireless group 18. Mobile service provider network 4 may then, for instance, use the single IMSI to setup the upstream traffic bearers that are utilized by each of wireless devices 16. In this way, the techniques relieve allocation pressures on various wireless device address/identity spaces, such as the IMSI space and PDP (e.g., IPv4) address space. In instances where the PDP is IPv4 or IPv6, the allocated IP address may be a unicast address. Mobile service provider network 4 is thus able to deliver traffic to multiple subscriber devices having the same IP address, despite that IP address being unicast rather than multicast.

In addition, the techniques may enable collective addressing of wireless devices 16 by server 19. That is, rather than addressing each of wireless devices 16 using an individually allocated PDP address for the respective wireless device, server 19 may address wireless group 18 using a unicast PDP address that is associated with the upstream traffic bearers established by mobile service provider network 4 for the group identity for wireless group 18. Mobile service provider network 4 maintains PDP address-bearer associations in contexts, such as PDP contexts or User Equipment (UE) contexts.

As a result, server 19 may output a single PDP packet carrying application-layer data and destined for the unicast PDP address for wireless group 18 via PDN 12, which mobile service provider network 4 then replicates and forwards to each of wireless devices 16. In one example application, server 19 may output a single "OFF" message to a group of wirelessly controlled street lights represented by wireless devices 16.

Similarly, the techniques allow each of wireless devices 16 to source service (PDP) traffic from a single unicast PDP address, thereby enabling server 19 to receive application-layer data from wireless devices as a group, i.e., as wireless group 18. In one example application, a group of utility meters represented by wireless devices 16 may output utility readings to server 19 using the same unicast PDP address.

Figure 2:
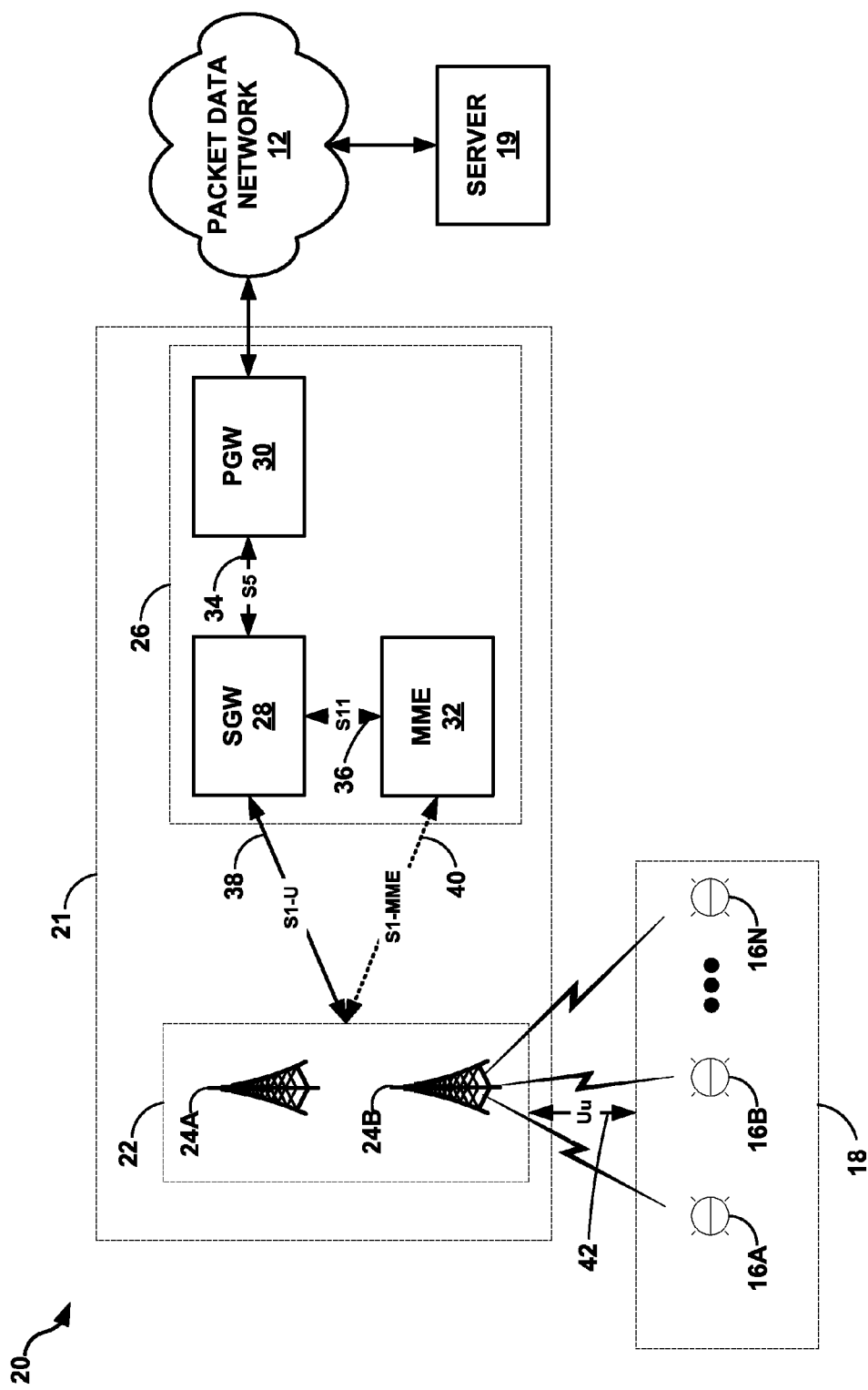
FIG. 2 is a block diagram illustrating an example Long Term Evolution (LTE) mobile service provider network that performs the collective addressing and packet delivery techniques described in this disclosure.

FIG. 2 is a block diagram illustrating an example network system 20 that performs the collective addressing and packet delivery techniques described in this disclosure. Network system 20 may represent an embodiment of network system 2 of FIG. 1. In this example, network system 20 includes a Long Term Evolution (LTE) mobile service provider network 21 ("LTE network 21") that includes an Evolved Packet Core (EPC) 26 interfaced to an Evolved UTRAN (E-UTRAN) 22. LTE network 21 enables and transports service traffic exchanged between wireless devices 16 and server 19 via PDN 12. EPC 26 and E-UTRAN 22 may represent embodiments of mobile core network 8 and radio access network 6 of FIG. 1, respectively.

EPC 26 provides mobility management, session management, and packet routing and transfer for network system 2. EPC 26 comprises PDN Gateway 30 ("PGW 30") logically connected to Serving Gateway 28 ("SGW 28") via S5 interface 34 operating over a communication link. S5 interface 34 provides protocols to foster user plane tunneling and tunnel management between PGW 30 and SGW 28. S5 interface 34 may comprise a user plane protocol stack that includes GPRS Tunneling Protocol-User Plane (GTP-U) executing over User Datagram Protocol/Internet Protocol (UDP/IP). The term "communication link," as used herein, comprises any form of transport medium, wired or wireless, and can include intermediate nodes such as network devices. SGW 28 hosts mobility anchoring, packet routing and forwarding, lawful interception, and other functionality. PGW 30 hosts packet filtering, lawful interception, PDP address allocation, and other functionality.

EPC 26 additionally comprises Mobility Management Entity 32 ("MME 32") logically connected to SGW 28 via S11 interface 36 operating over a communication link. S11 interface 36 provides protocols with which MME 32 establishes and manages bearers that traverse or terminate at SGW 28. S11 interface 36 may comprise a control plane protocol stack that includes GTP-Control Plane (GTP-C) executing over UDP/IP. In addition to bearer management and establishment, MME 32 hosts Non-Access Stratum (NAS) signaling, PDN 30 and SGW 28 selection, roaming, and authentication, for instance. In some embodiments, EPC 26 comprises additional MMEs, SGWs, and/or PGWs.

SGW 28 and MME 32 connect to eNode Bs 24A-24B ("eNBs 24") of E-UTRAN 22 via respective aspects of an S1 interface. Specifically, SGW 28 logically connects to individual eNBs 24 via S1-U interface 38 operating over a communication link, and MME 32 logically connects to individual eNBs 24 via S1-MME interface 40 operating over a communication link to establish bearers over S1-U interface 28 between SGW 28 and individual eNBs 24. S1-U interface 38 may comprise a user plane protocol stack that includes GTP-U operating over UDP/IP. S1-MME interface 40 may comprise a control plane protocol stack that includes S1 Application Protocol (S1-AP) transported by Stream Control Transmission Protocol (SCTP) running over IP. ENB 24B serves wireless devices 16 via respective radio links to eNB 24B operating over a Uu interface 42 and may represent an embodiment of base station 14 of FIG. 1. Uu interface may comprise a control and user protocol stack that includes PDCP operating over Radio Link Control (RLC) protocol.

LTE network 21 establishes a service bearer for wireless devices 16 to PDN 12 for transporting service traffic between the wireless devices and server 19. Each end-to-end service bearer comprises individual sub-bearers that traverse user plane interfaces, which include Uu interface 42, S1-U interface 38, and S5 interface 34. Conventionally, when one of wireless devices 16 requests packet delivery services from LTE network 21 by sending a NAS Attach Request message toward eNB 24B, causing MME 32 to issue a Create Session Request message over S11 interface 36 to SGW 28. As described in further detail below, the requesting wireless device 16, eNB 24B, MME 32, SGW 28, and PGW 30 cooperate to establish the individual sub-bearers over the user plane interfaces and to link the sub-bearers to form a service bearer for the requesting wireless device 16. In some instances, PGW 30 allocates, or requests for allocation, a PDP address to the requesting wireless device 16. PGW 30 then maps the PDP address to the service bearer established for the requesting wireless device 16.

In accordance with the collective addressing and packet delivery techniques of this disclosure, wireless devices 16 store a group identity that identifies each of the wireless devices as a member of wireless group 18. Wireless devices 16 identify themselves to LTE network 21 as members of wireless group 18 by including the group identity in a message to eNB 24B. When one of wireless devices 16 communicates the group identity to LTE network 21 in, for instance, a connection request such as an RRCConnectionRequest or an attach request such as a NAS Attach Request, eNB 24B, MME 32, and SGW 28 cooperate to associate the group identity with sub-bearers for a service bearer for the wireless device. For example, upon establishing the service bearer, eNB 24B may include a mapping structure that maps the group identity to the radio bearer on Uu interface 42 for the wireless device. Another mapping structure of eNB 24B may map the group identity to an S1 bearer (e.g., a GTP tunnel) between eNB 24B and SGW 28.

As additional wireless devices 16 of wireless group 18 communicate the group identity to LTE network 21, eNB 24B, MME 32, and SGW 28 cooperate to graft additional sub-bearers, established for the additional wireless devices 16, to the service bearer established for the initially attached one of wireless devices 16. Grafting the additional sub-bearers to the service bearer may comprise appending a mapping structure of eNB 24B to map the group identity to radio bearers on Uu interface 42 for the additional wireless devices 16. As a result, the group identity for wireless group 18 associates radio bearers for wireless devices 16 with a single S1 bearer and a single S5 bearer in LTE network 21.

ENB 24B uses the group identity to identify radio bearers mapped to particular single S1 bearer established by LTE network 21 for end-to-end service traffic for wireless devices 16. As downstream service traffic arrives at eNB 24B in the particular S1 bearer, eNB 24B replicates the service traffic and outputs replicated service traffic to each of the radio bearers associated with the particular S1 bearer. When eNB 24B receives upstream traffic from one of wireless devices 16 in a radio bearer associated with the particular S1 bearer, eNB 24B outputs the upstream traffic to the particular S1 bearer for transport to packet data network 12.

Figure 3:
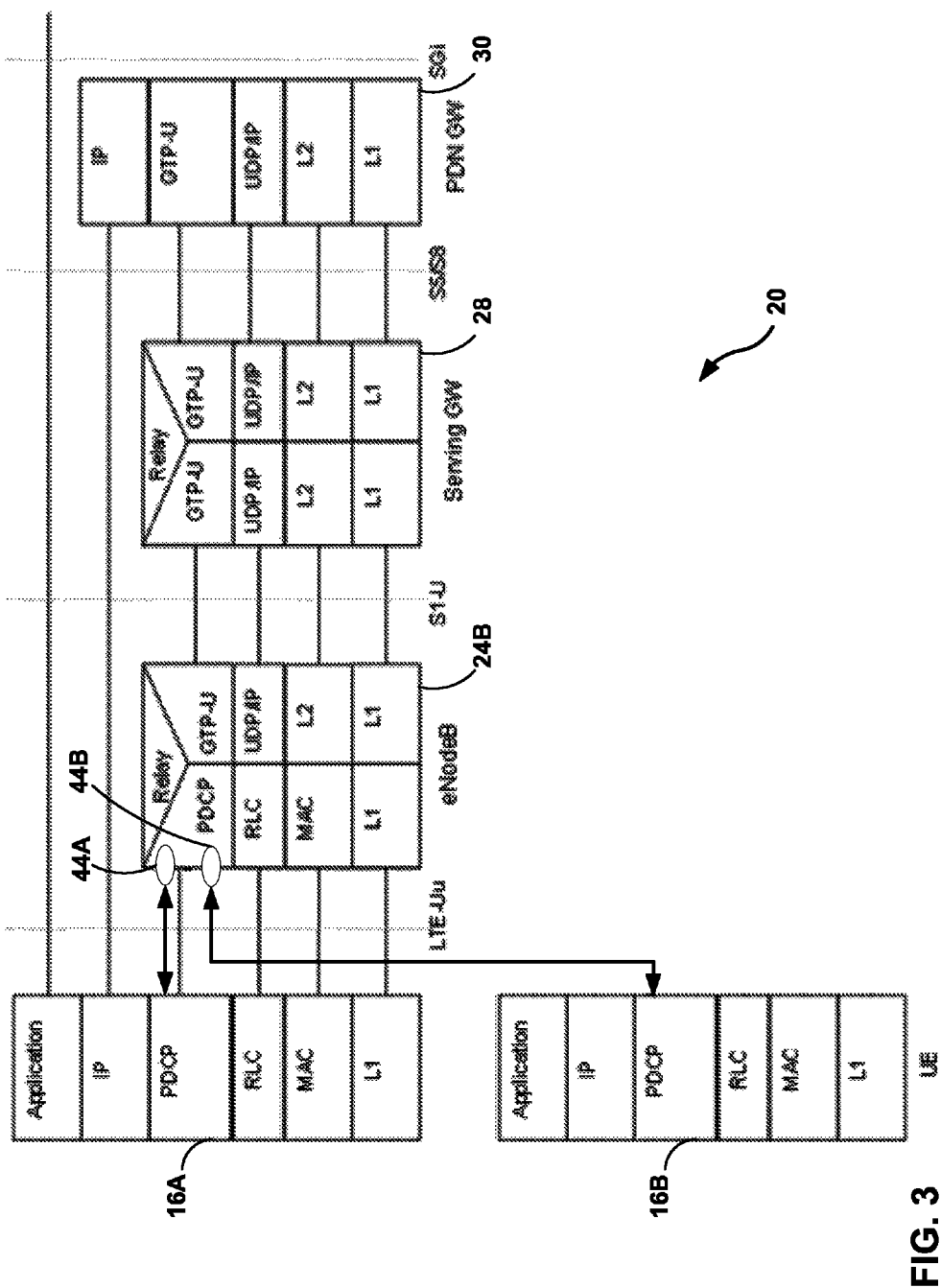
FIG. 3 is a block diagram illustrating example user-plane protocol stacks for wireless devices and constituent devices of the example LTE network of FIG. 2.

FIG. 3 is a block diagram illustrating example user-plane protocol stacks for wireless devices 16A-16B and constituent devices of LTE network 21 of FIG. 2. In the illustrated embodiment, eNB 24B and SGW 28 transport IP packets that carry application data on a forwarding path between PGW 30 and wireless devices 16A-16B. S5 interface 34 carries GTP packets exchanged between SGW 28 and PGW 30 in an S5 bearer. S1-U interface 38 carries GTP packets exchanged between SGW 28 and eNB 24B in an S1 bearer. For a particular service bearer, a context data structure in SGW 28 maps the S5 bearer to the S1 bearer to enable SGW 28 to relay UDP datagrams carried in GTP packets between the S5 bearer and the S1 bearer.

Conventionally, a UE context in eNB 24B is a context data structure that maps an S1 bearer to a single data radio bearer to create an evolved Radio Access Bearer, or E-RAB, between a wireless device and a serving gateway. ENB 24B then employs the UE context to relay packetized data between the S1 bearer and the data radio bearer of the E-RAB. Uu interface 42 carries PDCP Data PDUs on data radio bearers established between wireless terminals, that is, between eNB 24 and respective wireless devices 16A-16B. Each radio bearer between eNB 24 and wireless devices 16A-16B is associated, in the respective terminal, with one PDCP entity of the terminal that transfers the data for the radio bearer to a PDCP entity in the other terminal. Further details regarding PDCP are found in "3GPP TS 36.323—Packet Data Convergence Protocol (PDCP) Specification," Release 9, 3rd Generation Partnership Project, Technical Specification Group Radio Access Network, 2009, the entire contents of which are incorporated herein by reference.

The illustrated protocol stacks include instantiated PDCP entities 44A-44B ("PDCP entities 44") for respective wireless devices 16A-16B attached to LTE network 21. In accordance with the techniques of this disclosure, eNB 24B uses a group identity received by LTE network 21 from wireless devices 16A-16B to generate and store a mapping structure that maps a downlink Tunnel Endpoint Identifier (TEID) of a GTP tunnel on S1-U interface 38 to both PDCP entities 44. In addition, eNB 24B may use the group identity to generate and store a mapping structure to map an uplink TEID of a GTP tunnel on S1-U interface 38 to both PDCP entities 44.

ENB 24B, upon receiving from SGW 28 a GTP-U packet having the mapped downlink TEID, determines from mapping structure that both PDCP entities 44 map to the downlink TEID. As a result, eNB 24B relays the GTP-U packet payload to each of PDCP entities 44 for delivery to each of wireless devices 16A-16B. Similarly, upon receiving a PDCP Data PDU from either of wireless devices 16A-16B with one of PDCP entities 44, eNB 24B determines from a mapping structure that the PDPC entity maps to an uplink TEID. ENB 24B therefore outputs the PDCP Data PDU payload to as a GTP-U packet that includes the uplink TEID in the GTP header. As a result, eNB 24B transports IP packets received from either of wireless devices 16A-16B using the same GTP tunnel executing in a single S1 bearer established by LTE network 21 and associated with the group identity.

Figure 4A:
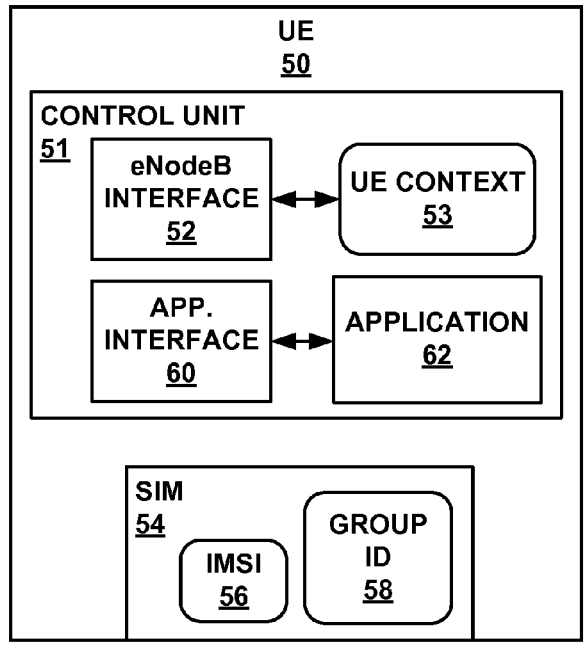
FIG. 4A is a block diagram illustrating an example wireless device configured to enable collective addressing using the techniques described herein.

FIG. 4A is a block diagram illustrating user equipment 50 ("UE 50"), a wireless device configured to enable collective addressing based on the techniques described herein. UE 50 may represent an example embodiment of one of wireless devices 16 of FIGS. 1-2. Subscriber identity module 54 ("SIM 54") is a tangible computer-readable medium that stores IMSI 56 to identify a subscriber to a mobile service provider network as well as group identity 58 ("group ID 58")

to specify one or more wireless groups in which the subscriber, represented by IMSI 56, is a member. SIM 54 may comprise a removable SIM card. A mobile network operator, or service provider, may program SIM 54 prior to operation of UE 50 to assign IMSI 56 and group identity 58. The mobile network operator may program multiple UEs with identical IMSI 56 and group identity 58 values.

Group identity 58 comprises a string or numerical value that identifies a group of one or more wireless devices that may attach to the mobile service provider network as a group. That is, wireless devices that share the group identity may be addressed collectively, may be controlled by a server as a group, and may be charged collectively in accordance with the described techniques. In some embodiments, group identity 58 may comprise a plurality of group identities that represent different wireless groups to which UE 50 is subscribed, i.e., different groups in which the subscriber, represented by IMSI 56, is a member.

Control unit 51 of UE 50 provides an operating environment for execution of eNodeB interface 52, application 62, and application interface 60 ("app. interface 60"). Control unit 51 may comprise one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. Control unit 51 may comprise network interfaces or other communication interfaces (not shown).

Application 62 executes application-level functions of UE 50. Application 62 may interface with peripherals to, for example, turn a light on/off or read a gas meter. Application 62 may in some instances interface with a user. Application 62 exchanges data and/or control information with a remote server via application interface 60.

ENodeB interface 52 of UE 50 implements protocols to exchange control and data plane communications with an eNB, such as eNB 24 of FIG. 2. For instance, eNodeB interface 52 may implement an LTE-Uu interface. ENodeB interface 52, in this example, implements a control plane stack that includes Non-Access Stratum (NAS) protocol, Radio Resource Control (RRC), PDCP, Radio Link Control (RLC), and Media Access Control operating over layer one (L1) of the Open System Interconnect (OSI) model. Layer one is the physical layer and may be a wireless medium such as radio. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. For example, the term "application layer" refers to layer seven of the OSI model. As another example, the term "network layer" refers to layer three of the OSI model. ENodeB interface 52 uses NAS to communicate with an MME via an ENodeB. ENodeB interface 52 implements a user plane stack that includes IP or another PDP, as well as PDCP, RLC, and MAC operating over L1. The network layer (L3) of the user plane stack carries application-layer data to a PDN gateway for the mobile service provider network that serves UE 50. ENodeB interface 52 accepts application-layer data from application interface 60 for transport to a remote server via an eNB and delivers application-layer data received from the eNB to application interface 60.

Upon startup or upon entering the service area of a local eNB, ENodeB interface 52 issues an RRCConnectionRequest to the local eNB to request an RRC connection. An RRC connection includes a signaling radio bearer (SRB). In some embodiments, eNodeB interface 52 includes the value of group identity 58 in an extended RRCConnectionRequest-r8 information element (IE) of the RRCConnectionRequest. In one example, the extended IE has the form:

```
RRCConnectionRequest-r8-IEs ::=
    SEQUENCE  {
    ue-Identity              InitialUE-Identity,
    establishmentCause       EstablishmentCause,
    spare                    BIT STRING (SIZE (1))
    group-Identity           BIT STRING (SIZE (32)) (optional)
    }
```

In the above example, the group-Identity parameter is an optional 32-bit string parameter that UE 50 uses to identify itself as member of a wireless group defined in group identity 58. When the serving eNB receives a group identity value in an RRCConnectionRequest message, the serving eNB maps an identifier for the UE, e.g., an S-TMSI included in the ue-Identity parameter, to the group identity in a table or other mapping data structure. The S-TMSI is a temporary UE identity, typically allocated to UE 50 by an MME, in order to support the subscriber identity confidentiality. The local eNB may use the UE identifier to select a data radio bearer (DRB) established between the eNB and UE 50. As a result of mapping the UE identifier to the group identity, the eNB may select DRBs for any UE, such as UE 50, that is mapped to the group identity and replicate and output downstream data traffic to the selected DRBs in accordance with the techniques of this disclosure. Further details regarding RRC are found in "3GPP TS 36.331—Radio Resource Control (RRC) Protocol Specification," Release 8, 3rd Generation Partnership Project, Technical Specification Group Radio Access Network, 2009, the entire contents of which are incorporated herein by reference.

In some embodiments, eNodeB interface 52 includes group identity 58 in an extended NAS Attach Request message issued to an MME via the serving eNB to request the mobile service provider network to perform an attach procedure with respect to UE 50. A NAS Attach Request message additionally includes IMSI 56 to identify the UE to the MME. As described in further detail below, an MME operating to set up collective addressing using the described techniques maps IMSI 56 to group identity 58 and sends the mapped values to the serving eNB to establish a radio access bearer that maps to group identity 58. In some embodiments, the techniques may use a UE 50 identifier other than IMSI 56, such as an S-TMSI or globally unique temporary identity (GUTI).

If the MME successfully attaches UE 50 to the mobile service provider network in response to the Attach Request message, eNodeB interface 52 receives a RRCConnectionReconfiguration message that includes a PDP address for a PDN to which access was requested using, e.g., an Access Point Name (APN) that corresponds to application 60. The PDP address may be an IPv4 or IPv6 address. The received message also includes an Evolved Packet System (EPS) bearer identity for the APN. ENodeB interface 52 stores the PDP address and EPS bearer identity to UE context 53. In some embodiments, UE 50 stores a static or default PDP address. In such embodiments, UE may use the static or default PDP address to source service data traffic, rather than requesting PDP address allocation from the mobile service provider network.

The RRCConnectionReconfiguration message from the serving eNB causes UE 50 to establish at least a data radio bearer (DRB) for the EPS specified by the EPS bearer identity. If successful, eNodeB interface 52 returns an RRCConnectionReconfigurationComplete message to the serving eNB.

In some instances, eNodeB interface 52 accepts application-layer data from application interface 60 for transport to a remote server. ENodeB interface 52 determines, from UE context 53, the PDP address and EPS bearer identity for application 62 as well as the corresponding DRB established for the EPS bearer. ENodeB interface 52 sends the application-layer data as service data traffic, sourced by the PDP address, via the corresponding DRB to the serving eNB. In some instances, eNodeB interface 52 receives service data traffic destined for the PDP address. In such instances, eNodeB interface 52 delivers application-layer data of the service data traffic to application interface 60.

In the context of other architectures, such as that of a U-TRAN or WiMAX, UE 50 may include interfaces as required to communicate using protocols defined for these other architectures. For example, UE 50 may include a Node B interface when subscribed to a mobile service provider network that operates a U-TRAN. Protocols defined for other architectures may exchange similar values as those described above with respect to an E-UTRAN architecture using protocol-specific messages, modified in an analogous manner to those modified as described above, to implement the techniques of this disclosure.

Figure 4B:
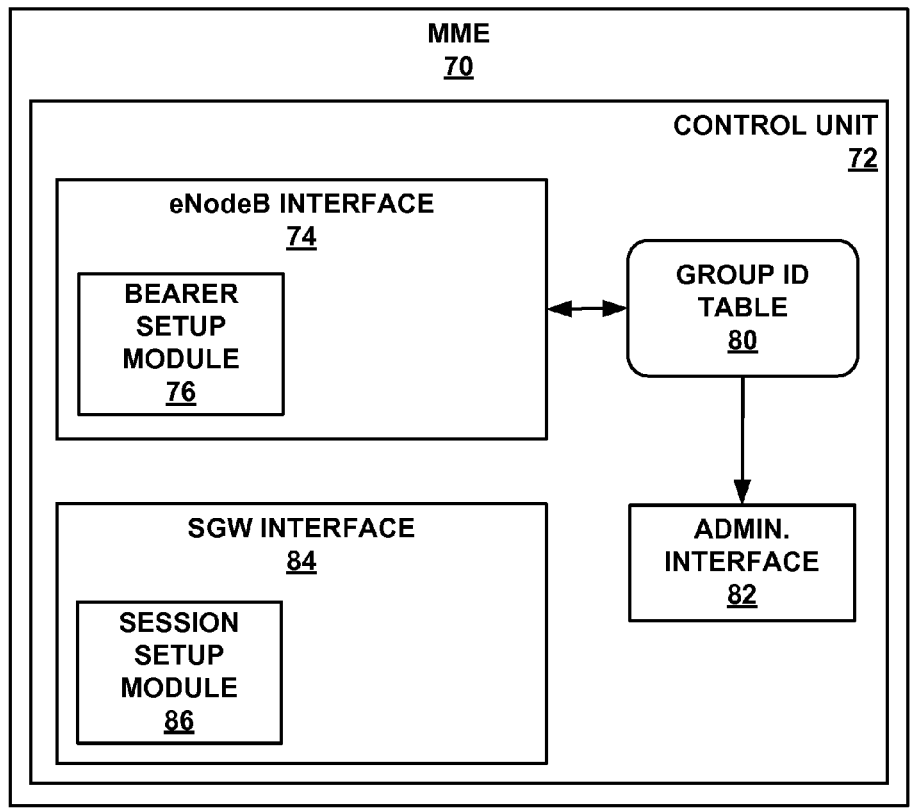
FIG. 4B is a block diagram illustrating an example mobility management entity of an mobile service provider LTE network that cooperates with other devices of the LTE network to establish, according to the described techniques, bearers for wireless devices that are members of a wireless group.

FIG. 4B is a block diagram illustrating an example mobility management entity 70 ("MME 70") of a mobile service provider network that cooperates with other devices of the network to establish, according to the described techniques, sub-bearers for a group identity and for wireless devices that are members of the wireless group corresponding to the group identity. MME 70 may represent an example embodiment of MME 32 of FIG. 2. Control unit 72 of MME 70 provides an operating environment for execution of eNodeB interface 74, serving gateway interface 84 ("SGW interface 84"), and administrative interface 82 ("admin. interface 82"). Control unit 72 may comprise network interfaces or other communication interfaces (not shown).

ENodeB interface 74 is a base station interface that implements control plane protocols to exchange signaling communications with a base station, such as eNB 24B of FIG. 2. ENodeB interface 74 may implement an S1-MME interface. In this example, eNodeB interface 74 implements a control plane stack that includes S1-Application Protocol ("S1-AP") transported by Stream Control Transmission Protocol (SCTP) operating over IP.

ENodeB interface 74 receives group identities in communications issued by wireless devices, such as UE 50 of FIG. 4A, and relayed by a serving eNB to MME 70. For example, eNodeB interface 74 may receive a group identity in a NAS Attach Request message. The Attach Request message includes a group identity and IMSI for the wireless device requesting attachment to the network. ENodeB interface 74 stores a mapping of the received IMSI to the received group identity to group identity table 80 ("group ID table 80"), a mapping data structure that stores records to describe mappings of UE identifiers to group identities. In other words, a group ID table 80 record maps one or more UE identifiers to a group identity. The Attach Request message may constitute part of a S1-AP Initial UE Message from the serving eNB that additionally includes an eNB-local UE identifier, such as an eNB UE S1AP ID, which uniquely identifies the UE over the S1 interface within an eNB. As used herein, mapping data structures may include tables, linked lists, databases, and other data structures that associate one value or object with another value or object. In some embodiments, group identity table 80 may store a count of wireless devices that have the group identity and are attached to the mobile service provider network, rather than a mapping. In such embodiments, as the wireless devices detach, MME 70 decrements the count, and when the count reaches zero, MME 70 may issue a Release Access Bearers Request to the serving SGW to tear down the S1 and S5 bearers.

Bearer setup module 76 determines from group identity table 80 whether the group identity received in the Attach Request message is an initial group identity, that is, whether group identity table 80 already includes a record for the received group identity. A preexisting group identity record indicates MME 70 has already established a working service bearer in the mobile service provider network for the group identity. Where a working service bearer for the group identity is already present in the network, MME 70 need only graft a data radio bearer for the wireless device requesting attachment to the preexisting service bearer for the group identity. Where the group identity is an initial group identity, however, MME 70 establishes a service bearer for the group identity to transport service data traffic between the UE that issued the initial Attach Request message and a PDN gateway, such as PGW 30 of FIG. 2. Session setup module 86 of SGW interface 84 issues a Create Session Request message to a selected serving gateway to initiate a Create Session procedure that establishes upstream bearers for a new service bearer. Session setup module 86 receives a Create Session Response message from the selected serving gateway that includes an SGW TEID for a GTP tunnel on the S1-U interface.

After session setup module 86 receives the Create Session Response message, to further establishment of a new service bearer for the group identity, bearer setup module 76 sends an Initial Context Setup Request message to the serving eNB. In general, an Initial Context Setup Request message initiates an Initial Context Setup Request procedure to establish an overall UE context in the serving eNB. Conventionally, an eNB UE context is a block of information in an eNB associated to one active UE. The block of information contains the necessary information required to maintain the E-UTRAN services towards the active UE. At least UE state information, security information, UE capability information and the identities of the UE-associated logical S1-connection shall be included in the eNB UE context. The Initial Context Setup Request message may include an eNB-local UE identifier, such as an eNB UE S1AP AP ID, for the UE requesting attachment. The Initial Context Setup Request message may include an E-RAB Setup Request message that includes the SGW TEID received by session setup module 86 in the Create Session Response message. An E-RAB Setup Request message directs a receiving eNB to assign resources for a new E-RAB and setup an S1 bearer on the S1-U interface as well as a DRB on the Uu interface. The SGW TEID identifies the uplink TEID in the eNB for a GTP tunnel that constitutes the uplink S1 bearer of the new E-RAB.

In accordance with the described techniques, bearer setup module 76 extends the Initial Context Setup Request message to further include the group identity received in the Attach Request message. Upon receiving the Initial Context Setup Request message, as described in further detail below, the serving eNB ties the group identity to an E-RAB established for the UE requesting attachment to the network. In this way, the serving eNB may replicate traffic received in the E-RAB to any attached wireless device that is a member of the wireless group referenced by the group identity.

In addition, the serving eNB returns an Initial Context Setup Response message to session setup module 86 that includes an eNB TEID. Session setup module 86 forwards the eNB TEID to the selected serving gateway in a Modify Bearer Request message. The selected serving gateway may use the eNB TEID identifies the downlink TEID in the eNB for a GTP tunnel that constitutes the downlink S1 bearer of the new E-RAB.

When bearer setup module 76 determines from group identity table 80 that the group identity received in an Attach Request message is not an initial group identity, MME 70 need only graft a new data radio bearer for the wireless device requesting attachment to the preexisting service bearer for the group identity. Session setup module 86 may therefore forego an additional Create Session procedure for wireless devices requesting attachment with a group identity for which a service bearer already is present in the network. In instances where multiple eNBs serve a wireless group, session setup module 86 may perform an additional Create Session procedure to establish a new E-RAB for the group identity to traverse an additional eNB.

To establish and graft a new data radio bearer for the requesting wireless device to the service bearer for the wireless group, bearer setup module 76 sends an extended Initial Context Setup Request message to the serving eNB that includes the group identity and the eNB-local UE identifier for the wireless requesting attachment that MME 70 received in, for example, an S1-AP Initial UE Message. As described in detail with respect to FIG. 5, the serving eNB establishes a new DRB for the requesting wireless device and maps the new DRB to an S1 bearer for the E-RAB previously established for the group identity.

Control unit 72 additional comprises administrative interface 82 ("admin. interface 82"), which presents a visual, network, peripheral, or other interface by which an administrator may query group identity table 80 to determine, for a group identity, the number of wireless devices attached to the network. Administrative interface 82 may comprise, for instance, remote procedure calls (RPCs), Simple Object Access Protocol (SOAP) methods, a graphical user interface (GUI), or a command line interface. For human-cognizable presentation, administrative interface 82 may be coupled to a computer monitor, a television, a projector, speakers, or other audio and video output devices (not shown). To receive user input, administrative interface 82 may be coupled to a keyboard, a mouse, or other peripherals.

SGW interface 84 of MME 70 is a serving node interface that implements control plane protocols to exchange signaling communications with a serving node, such as SGW 28 of FIG. 2. SGW interface 84 may implement an S11 interface. In this example, SGW interface 84 implements a control plane stack that includes GTP-C transported by UDP/IP. In some embodiments, SGW interface 84 may interface to a different type of serving node, such as a radio network controller (RNC) or SGSN.

In some instances, wireless devices that subscribe to a particular wireless group may span multiple eNBs, e.g., eNBs 24 of FIG. 2. Because SGW 28 may serve a plurality of eNBs, MME 70 may coordinate with a serving gateway to cause the serving gateway to both replicate downstream service traffic to any eNBs that serve an attached wireless device that subscribes to a particular wireless group and to aggregate upstream traffic, as issued from such wireless devices, from the eNBs.

In some embodiments, to establish sub-bearers for a service bearer for a wireless group during an Initial Attach procedure for a wireless device, SGW interface 84 issues an extended Create Session Request message that includes the group identity for the wireless group to a selected SGW 28. A Create Session Request message extended to include the group identity in this manner directs the receiving SGW to map the session to the group identity. SGW 28 may map the session to the group identity in a UE context.

SGW 28 may receive multiple Create Session Request messages to establish sessions across multiple eNBs, where each of the messages includes the same group identity. That is, in such instances, the multiple eNBs serve a plurality of wireless devices that are members of the same wireless group. In such instances, SGW 28 and PDN 30 may establish a single S5 bearer for service data traffic for wireless devices that are members of the wireless group identified by the group identity. SGW 28 may then replicate downstream service traffic to one or more S1 bearers terminated by one or more eNBs that serve the wireless devices.

In one example implementation, SGW 28 maps a downlink (PDW) TEID for an S5 bearer for the session to the group identity. In addition, SGW 28 maps the group identity to an S1 bearer established pursuant to, for example, a Modify Bearer Request received by SGW 28 and issued by SGW interface 84 of MME 70 after successful E-RAB setup for an E-RAB that traverses the eNB that serves the attaching wireless device. SGW 28 may map the group identity to multiple S1 bearers as SGW 28 receives Modify Bearer Request messages for multiple eNBs that include eNB addresses and downlink (eNB) TEIDs that characterize the S1 bearers. Thereafter, SGW 28 uses the downlink TEID for the S5 bearer to identify the group identity for downstream service traffic for the wireless group. SGW 28 then uses the group identity to determine any mapped S1 bearers, replicates the downstream service traffic, and outputs the replicated traffic to the mapped S1 bearer. In some instances, SGW 28 maps a downlink TEID for the S5 bearer directly to downlink TEIDs for any S1 bearers.

In some embodiments, SGW 28 may map uplink (eNB) TEIDs and eNB addresses for one or more S1 bearers to the group identity. In addition, SGW 28 maps the group identity to an S5 bearer described in a Create Session Response message received from PDN 30. The mapping may include a mapping to one or more uplink (PDN) TEIDs for the one or more S5 bearers. Thereafter, SGW 28 uses the S1 bearers to identify the group identity for upstream service traffic for the wireless group. That is, when SGW 28 receives a GTP-U packet, the SGW determines whether the GTP header identifies an eNB address and TEID that is mapped to the group identity. If so, the GTP-U packet carries service data traffic originated from a wireless devices in the wireless group identified by the group identity. SGW 28 then uses the group identity to determine an S5 bearer for the service data traffic and forwards the traffic, in a new GTP-U packet, to a PDN gateway, e.g., PGW 30, via the S5 bearer mapped to the group identity.

In the context of other architectures, such as that of a U-TRAN and WiMAX, MME 70 may represent an amalgam of other devices, such as an RNC and an SGSN. In such architectures, these other devices perform the techniques of this disclosure, modified in an analogous manner to operate using the specific protocols of the particular architecture. For example, in a U-TRAN architecture, a UE may send a group identity and a UE identity to a local anchor device (e.g., an SGSN) in an Attach Request message issued as part of a GPRS Attach procedure. The local anchor device, a serving Node B, and a serving RNC cooperate to establish bearers for service data traffic for wireless devices that are members of the wireless group identified by the group identity.

Figure 5:
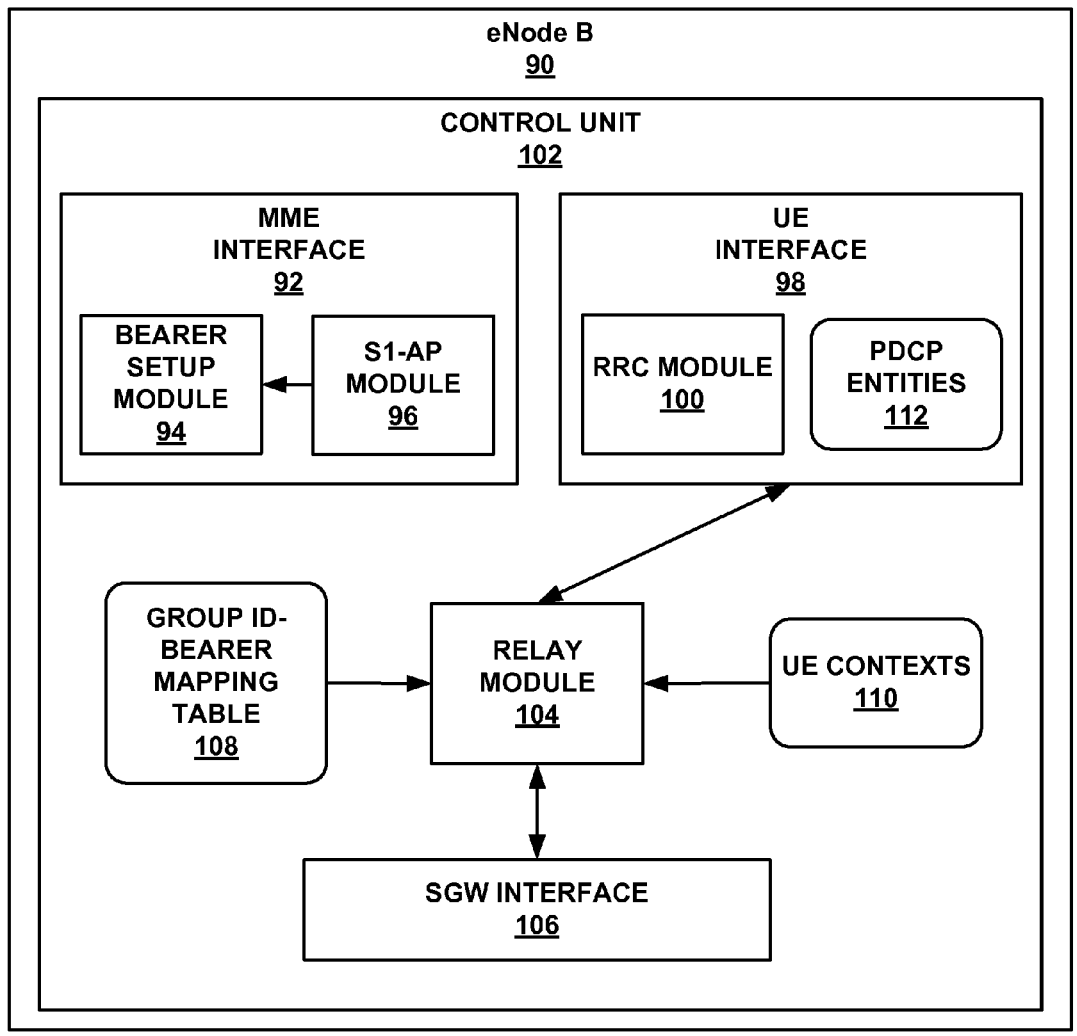
FIG. 5 is a block diagram illustrating an example eNode B for a mobile service provider LTE network that establishes bearers and delivers packets to enable the collective addressing techniques herein described.

FIG. 5 is a block diagram illustrating eNode B 90 (hereinafter, "eNB 90"). ENB 90 may represent an example embodiment of one of eNode Bs 24 of FIG. 2. Control unit 102 of eNB 90 provides an operating environment for execution of MME interface 92, UE interface 98, relay module 104, and SGW interface 106. Control unit 102 may comprise one or more processors (not shown), including one or more microprocessors, digital signal processors (DSPs), application specific integrated circuits (ASICs), field programmable gate arrays (FPGAs), or any other equivalent integrated or discrete logic circuitry, as well as any combinations of such components, to execute modules that implement the functionality described herein. Control unit 102 may comprise network interfaces or other communication interfaces (not shown).

MME interface 92 of eNB 90 implements control plane protocols to exchange signaling communications with an MME, such as MME 32 of FIG. 2. MME interface 92 may implement an S1-MME interface. In this example, MME interface 92 implements a control plane stack that includes S1-Application Protocol ("S1-AP") transported by Stream Control Transmission Protocol (SCTP) operating over IP. S1-AP module 96 of MME interface 92 executes S1-AP to perform the techniques of this disclosure. For example, S1-AP module 96 may receive a modified Initial Context Setup Request message from an MME that includes a group identity.

ENodeB interface 74 receives group identities in communications issued by wireless devices, such as UE 50 of FIG. 4A, and relayed by a serving eNB to MME 70. For example, eNodeB interface 74 may receive a group identity in a NAS Attach Request message. The Attach Request message includes a group identity and IMSI for the wireless device requesting attachment to the network. ENodeB interface 74 stores a mapping of the received IMSI to the received group identity to group identity table 80 ("group ID table 80"), a mapping data structure that stores records to describe mappings of UE identifiers to group identities. In other words, a group ID table 80 record maps one or more UE identifiers to a group identity. The Attach Request message may constitute part of a S1-AP Initial UE Message from the serving eNB that additionally includes an eNB-local UE identifier, such as an eNB UE S1AP ID, which uniquely identifies the UE over the S1 interface within an eNB. As used herein, mapping data structures may include tables, linked lists, databases, and other data structures that associate one value or object with another value or object.

UE interface 98 implements protocols to exchange control and data plane communications with a UE, such as one of wireless devices 16 of FIG. 2. For instance, UE interface 98 may implement an LTE-Uu interface. UE interface 98, in this example, implements a control plane stack that includes Non-Access Stratum (NAS) protocol, Radio Resource Control (RRC), PDCP, Radio Link Control (RLC), and Media Access Control operating over L1. Bearer setup module 94 receives setup directives from an MME and establishes Uu (radio) bearers with wireless devices using UE interface 98 in accordance with the techniques herein described.

RRC module 100 of UE interface 98 executes RRC in accordance with the techniques herein described. In some embodiments, RRC module 100 receives modified RRCConnectionRequest messages that include a group identity in an extended RRCConnectionRequest-r8 IE. When RRC module 100 receives a group identity value in an RRCConnectionRequest message, the RRC module 100 maps an identifier for the wireless device that issued the message, e.g., an S-TMSI, to the group identity in one of UE contexts 110 for a wireless group identified by the group identity.

Relay module 104 relays packet data units between S1-AP module 96 and RRC module 100 for NAS protocols in the control plane. For example, in some instances, RRC module 100 may carry an NAS Attach Request message that includes a group identity from a wireless device. Relay module 104 passes the message to S1-AP module 96, which includes the message in an S1-AP Initial UE Message, along with an eNB UE signaling connection ID, to an MME. As a result, the MME may the identity the eNB 90 as serving the wireless device as a member of a wireless group identified by the group identity.

PDCP entities 112 of UE interface 98 represent one or more PDCP entities established by UE interface 98 to each transfer user plane in an associated DRB or control data in an associated signaling radio bearer (SRB). PDCP entities 112 are located in a PDCP sublayer of the control plane and data plane protocol stacks implemented by UE interface 98.

SGW interface 106 of eNB 90 implements data plane protocols to exchange service data traffic with a serving gateway, such as SGW 28 of FIG. 2. SGW interface 106 may implement an S1-U interface. In this example, SGW interface 84 implements a data plane stack that includes GTP-U transported by UDP/IP. Bearer setup module 94 receives setup directives from an MME and establishes S1 bearers with SGWs using SGW interface 106 in accordance with the techniques herein described.

Group identity-bearer mapping table 108 (illustrated as "group ID-bearer mapping table 108"; hereinafter "mapping table 108") is an associative data structure comprising entries that each associate one or more of PDCP entities 112 with a group identity for groups of wireless devices, one or more of which is served by eNB 90. In some embodiments, mapping table 108 may associate, with a group identity, other values that may identify a bearer between eNB 90 and a wireless device, such as Radio Bearer Identifiers (RB IDs), Radio Access Bearer Identifiers (RAB IDs), evolved RAB IDs (E-RAB IDs), network addresses, an ISMI, TMSI, S-TMSI, and/or broadcast identifiers for wireless devices. An association in mapping table 108 may comprise a bi-directional mapping or a unidirectional mapping. In other words, mapping table 108 may map one or more of PDCP entities 112 to the group identity and/or map the group identity to one or more PDCP entities 112.

Conventionally, user equipment (UE) contexts comprises one or more data structures that each are associated to one active wireless device served by eNB 90 and comprise bearer and device identifiers that relay module 104 uses to stitch together sub-bearers for a service bearer. For example, a conventional UE context for a particular wireless device may store an identity of the UE-associated logical S1-connection, including uplink/downlink TEIDs for the S1-connection, as well as an E-RAB ID for an E-RAB allocated for the wireless device. According to the techniques of this disclosure, each of UE contexts 110 includes UE contexts that comprise an optional group identity field that, when populated in a particular UE context, specifies a group identity for the particular UE context. In this way, eNB 90 may associate a group identity to an S1 bearer for a wireless group.

Bearer setup module 94 exchanges signaling communication with an MME to receive bearer and context setup directives, establish bearers and contexts in cooperation with UE interface 98 and SGW interface 106, and reply to the MME with bearer and context setup responses. Bearer setup module 94 performs the techniques of this disclosure to map multiple data radio bearers (DRBs) to a group identity for a group of wireless devices.

In one example, bearer setup module 94 receives an Initial Context Setup Request message, modified to include a group identity, from S1-AP module 96. In addition, the Initial Context Setup Request message includes a eNB 90-local identifier for a wireless device, such as a UE signaling connection ID. Bearer setup module 94 queries, responsive to receiving the message, UE contexts 110 to determine whether a UE context for the group identity contained in the message is already present therein. That is, bearer setup module 94 determines whether a UE context already exists in UE contexts 110 for a wireless group that is served, at least in part, by eNB 90 and identified by the group identity. In some instances, bearer setup module 94 may query mapping table 108 to determine whether a mapping table entry exists for the group identity. If such a mapping table entry exists, then a UE context for the group identity is also present in UE contexts 110.

If UE contexts 110 does not already include a UE context for the group identity, bearer setup module 94 creates a UE context using information garnered from the Initial Context Setup Request message. Bearer setup module 94 populates the UE context with an SGW TEID for an S1 bearer to a serving gateway, such as SGW 28 of FIG. 2, and the group identity. In addition, bearer setup module 94 directs RRC module 100 to issue an RRCConnectionReconfiguration message to the wireless device identified by the UE signaling connection ID to establish a DRB with the wireless device and an associated PDCP entity. The RRCConnectionReconfiguration message additionally includes an EPS bearer identity and, in some instances, an allocated PDP address for the wireless device. Upon receiving an RRCConnectionReconfigurationComplete success message, RRC module 100 stores the PDCP entity for the new DRB to PDCP entities 112 and returns a reference or identity for the PDCP entity to bearer setup module 94. Bearer setup module 94 creates a new mapping table 108 entry and maps the PDCP entity to the group identity in the entry.

If, however, UE contexts 110 already includes a UE context for the group identity, bearer setup module 94 ties a new DRB for the wireless device identified in the Initial Context Setup Request message to the S1 bearer specified by the UE context. Specifically, bearer setup module 94 directs RRC module 100 to issue an RRCConnectionReconfiguration message to the wireless device identified by the UE signaling connection ID to establish a DRB with the wireless device and an associated PDCP entity. The RRCConnectionReconfiguration message additionally includes an EPS bearer identity and, in some instances, an allocated PDP address for the wireless device that bearer setup module 94 stored to the UE context for the group identity during attachment of an initial wireless device in the wireless group. As a result, each wireless device in the group uses the same EPS bearer (composed of separate DRBs for respective wireless devices) as well as the same PDP address, thus enabling collective addressing of the wireless devices. Upon receiving an RRCConnectionReconfigurationComplete success message, RRC module 100 stores the PDCP entity for the new DRB to PDCP entities 112 and returns a reference or identity for the PDCP entity to bearer setup module 94. Bearer setup module 94 determines the mapping table 108 entry for the group identity and maps the PDCP entity to the group identity in the entry. As a result, the mapping table 108 entry includes a plurality of PDCP entities mapped to a single group identity.

Relay module 104 uses UE contexts 110 and mapping table 108, generated according to the techniques described herein, to relay upstream service data traffic received by UE interface 98 to the appropriate SGW via SGW interface 106. In the illustrated embodiment, UE interface 98 receives upstream service traffic in one of PDCP entities 112 associated to a DRB for a wireless device. Relay module 104 attempts to determine a group identity for the upstream service traffic by querying mapping table 18 with an identifier for the receiving PDCP entity. Relay module 104 then keys into UE contexts 110 with the group identity to determine a UE context for the group identity. The determined UE context identifies an S1 bearer for the group identity using, for example, an SGW network address and uplink (SGW) TEID. Relay module 104 delivers the upstream service traffic to SGW interface 106 for transport in the S1 bearer, a GTP tunnel.

Relay module 104 receives downstream service data traffic in S1 bearers via SGW interface 106 and relays the service data traffic to one or more wireless devices in DRBs. In the illustrated embodiment, SGW interface 106 receives, in a logical S1 connection, GTP packets having a GTP header that identifies a source SGW, e.g., SGW 28, and a downlink (SGW) TEID. Relay module 104 determines a UE context for the service data traffic by keying the source SGW and downlink (SGW) TEID to a UE context in UE contexts 110. If the determined UE context includes a group identity populated to the optional group identity field, relay module 104 determines a mapping table 108 entry using the group identity from the UE context. The determined mapping table 108 entry includes mapping to one or more PDCP entities 112, to which relay 104 relays the downstream service traffic for delivery to one or more wireless devices in DRBs associated to the PDCP entities.

By mapping bearers for multiple wireless devices to a group identity using mapping table 108 and UE contexts 110, eNB 90 may identify downstream service traffic using state information stored by the eNode B. As a result, downstream service traffic does not need to carry the group identity to enable replication of the traffic to multiple wireless devices.

In the context of other architectures, such as that of a U-TRAN and WiMAX, eNode B 90 may represent another device, or a combination of devices, that offers wireless access to wireless devices, such as a Node B in conjunction with an RNC, or a Wi-Fi access point. In such architectures, these other devices perform the techniques of this disclosure, modified in an analogous manner to operate using the specific protocols of the particular architecture. For example, in a U-TRAN architecture, an RNC may store mapping table 108 and store PDP contexts to tie one or more DRBs to an Iu-PS bearer.

Figure 6:
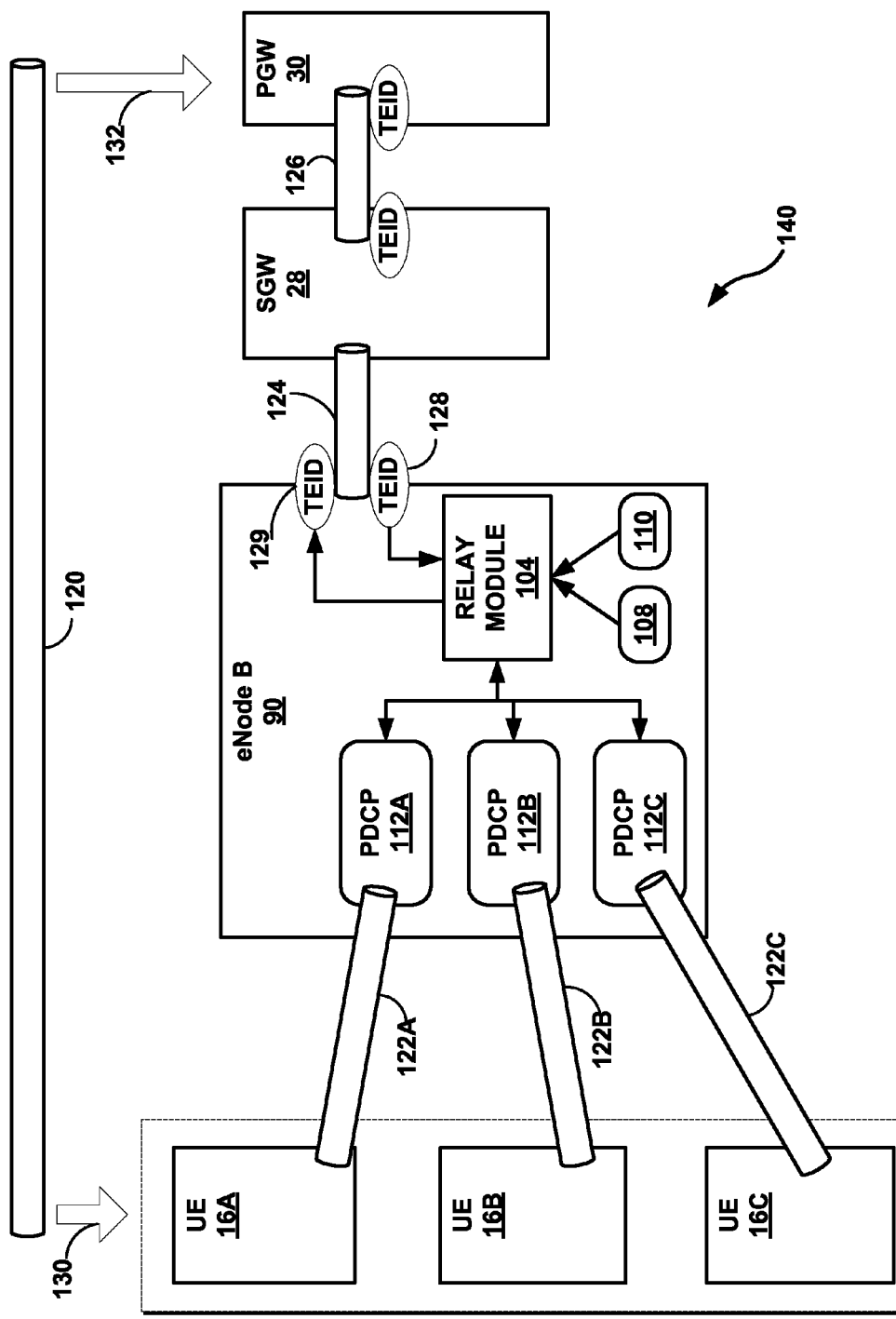
FIG. 6 is a block diagram illustrating an example mobile service provider network that maintains bearers and bearer mappings to delivery service data traffic in accordance with the collective addressing techniques herein described.

FIG. 6 is a block diagram illustrating an example mobile service provider network 140 that replicates downstream service traffic to multiple wireless devices and/or aggregates upstream service traffic from multiple wireless devices to devices that constitute a mobile core network. Mobile service provider network 140 may represent an embodiment of mobile service provider network 20 of FIG. 1. Mobile service provider network 140 comprises an embodiment of eNode B 90 of FIG. 2 as a serving eNode B for wireless devices 16 (illustrated as "UE 16") of wireless group 18.

Devices that constitute mobile service provider network 140 cooperate, along with MME 32 (not shown), to establish Evolved Packet System (EPS) bearer 120 to carry service data traffic between any of wireless devices 16 and PGW 30. An EPS bearer is the level of granularity for bearer level Quality of Service (QoS) control in LTE networks, including mobile service provider network 140. PGW 30 ties EPS bearer 120 to an external bearer of a packet data network (PDN) to create an end-to-end service bearer (not shown), enabling wireless devices 16 to exchange service traffic with the PDN using EPS bearer 120. The various bearers each illustrated as single tunnel may represent an upstream and/or downstream directions for the bearers.

EPS bearer 120 is composed of S5 bearer 126, S1 bearer 124, and any one of data radio bearers (DRBs) 122A-122C ("DRBs 122") operating over an LTE-Uu interface. ENB 90 and SGW 28 relay service data traffic between the constituent interface-level bearers to implement EPS bearer 120. Specifically, SGW 28 stores a one-to-one mapping between S5 bearer 126 and S1 bearer 124. ENB 90 stores a many-to-one mapping between DRBs 122 and S1 bearer 124 using group identity-bearer mapping table 108 ("mapping table 108") and UE contexts 110.

In the upstream direction, any of wireless devices 16, e.g., wireless device 16A, issues upstream service traffic 132 sourced by a PDP address allocated to the wireless group during an attach procedure for any of wireless devices 16 in accordance with the techniques of this disclosure. An uplink traffic flow template (TFT) (not shown) in wireless device 16A binds upstream service traffic 132, a service data flow, to EPS bearer 120 in the uplink direction and by association to DRB 122A, which carries upstream service traffic 132 to PDCP entity 112A of eNB 90. Relay module 104 maps PDCP entity 112 to a group identity for wireless group 18 in a mapping table 108 entry and keys the group identity to determine particular UE context for EPS bearer 120 in UE contexts 110. Relay module 104 identifies a logical S1 connection, S1 bearer 124, from the determined UE context and obtains the upstream (SGW) TEID 129 and SGW 128 network address parameters for S1 bearer 124 from the UE context. Relay module 104 then delivers upstream service traffic 132 to a GTP interface along with the S1 bearer 124 parameters for transport by the GTP tunnel that constitutes the upstream direction of S1 bearer 124. SGW 28 receives upstream service traffic 132 in S1 bearer 124 and relays the traffic to S5 bearer 126 for delivery to PGW 30.

In the downstream direction, PGW 30 receives downstream service traffic 130, addressed to a PDP address of wireless devices 16, from a PDN. A downlink TFT (not shown) of PGW 30 binds downstream service traffic 130, a service data flow, to EPS bearer 120 in the downlink direction and by association to S5 bearer 126. PGW 30 outputs downstream service traffic 130 to the downstream GTP tunnel specified by the S5 bearer, and SGW 128 relays the traffic to eNB via S1 bearer 124 in GTP packets having GTP headers that include downstream (SGW) TEID 128.

Relay module 104 keys downstream (SGW) TEID 128 to UE contexts 110 to determine a UE context for EPS bearer 120. In this instance, the determined UE context includes a group identity that relay module 104 uses to identify a mapping table 108 entry that maps PDCP entities 112A-112C to the group identity. Relay module 104 delivers downstream service traffic 130 to PDCP entities 112A-112C for output on respective DRBs 122A-122C to respective wireless devices 16A-16C.

Figure 7:
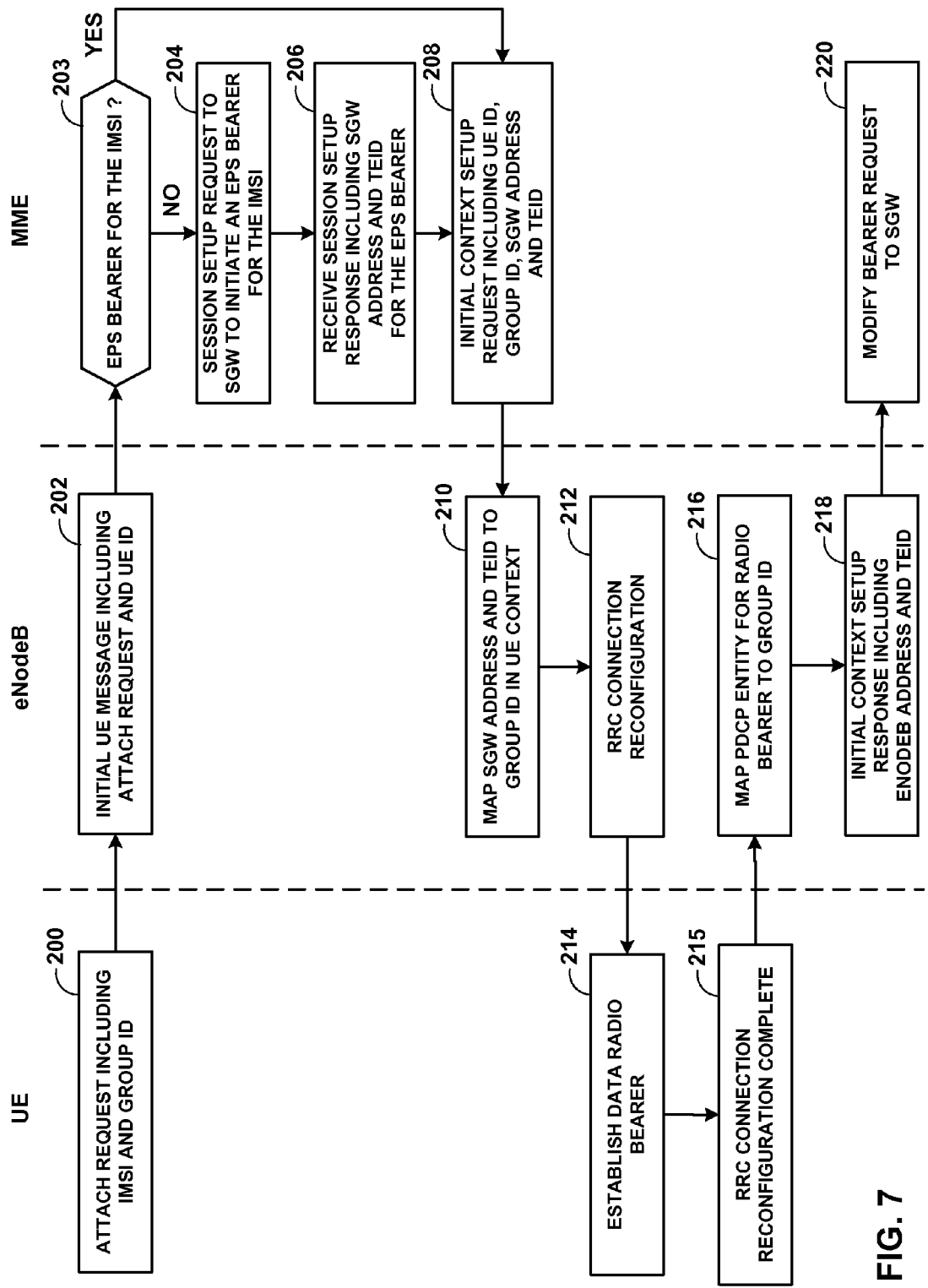
FIG. 7 is a flowchart illustrating an example operation of devices of a network system that set up and map sub-bearers to enable collective addressing for multiple wireless devices in accordance with the techniques of this disclosure.

FIG. 7 is a flowchart illustrating an example operation of UE 50 of FIG. 4A, MME 70 of FIG. 4B, and eNB 90 of FIG. 5 to set up and map sub-bearers to enable collective addressing for multiple wireless devices in accordance with the techniques of this disclosure. Initially, eNodeB interface 52 of UE 50 issues a NAS Attach Request message, which includes an IMSI or other UE 50 identifier as well as a group identity, to eNB 90 (200). UE interface 98 of eNB 90 forwards the Attach Request message to MME 70 in an Initial UE message, together with a local identifier that eNB 90 uses to identify UE 50 (202). ENodeB interface 74 of MME 70 receives the Initial UE message and bearer setup module 76 determines from group identity table 80 whether an EPS bearer already exists for the IMSI and/or group identity (203). If an EPS bearer does not yet exist for the wireless group (NO branch of 203), session setup module 86 issues a Session Setup Request message, including the IMSI received from UE 50, to a selected SGW to request an EPS bearer (204). Session setup module 86, in turn, receives a Session Setup Response message that includes the SGW address and upstream (SGW) TEID for the EPS bearer (206). Bearer setup module 76 of MME 70 forwards the SGW address and TEID in an Initial Context Setup Request that further includes the group identity and the local identifier received by eNodeB interface 74 in the Initial UE message (208). The Initial Context Setup Request may additionally include an assigned PDP address for UE 50. If an EPS bearer already exists for the wireless group (YES branch of 203), bearer setup module 76 issues an Initial Context Setup Request to eNB 90 that includes the group identity and local identifier, as well as an SGW address and TEID received in a Session Setup Response message during a prior attachment procedure for another wireless device in the wireless group of which UE 50 is also a member (208).

Bearer setup module 94 of eNB 90 receives the Initial Context Setup Request and stores the SGW address and TEID received therein to a new UE context in UE contexts 110 if a UE context for the group identity does not already exist (210). That is, bearer setup module 94 determines whether any of UE contexts 110 stores the group identity in an optional group identity field and, if not, creates a new UE context that includes the group identity and the SGW-facing GTP tunnel parameters for an S1 bearer for the new UE context. Bearer setup module 94 then directs RRC module 100 to issue an RRCConnectionReconfiguration message to UE 50, i.e., the wireless device identified by the local identifier received in the Initial Context Setup Request from MME 70 (212). ENodeB interface 52 of UE 50 receives the RRCConnectionReconfiguration message and establishes a DRB in accordance with the message (214), then returns an RRCConnectionReconfigurationComplete message to eNB 90 for receipt by bearer setup module 94 (215).

Bearer setup module 94 maps the particular one of PDCP entities 112 associated to the DRB and established in cooperation with UE 50 to the group identity (216). To map the PDCP entity to the group identity, bearer setup module 94 may add or supplement an entry in group identity-bearer mapping table 108 (216). Bearer setup module 94 then returns an Initial Context Setup Response, including an eNB 90 network address and a downstream (eNB) TEID, to MME 70 (218). MME 70, in turn, directs the selected SGW to use eNB 90 and the downstream (eNB) TEID by issuing to the selected SGW a Modify Bearer Request (220).

Figure 8:
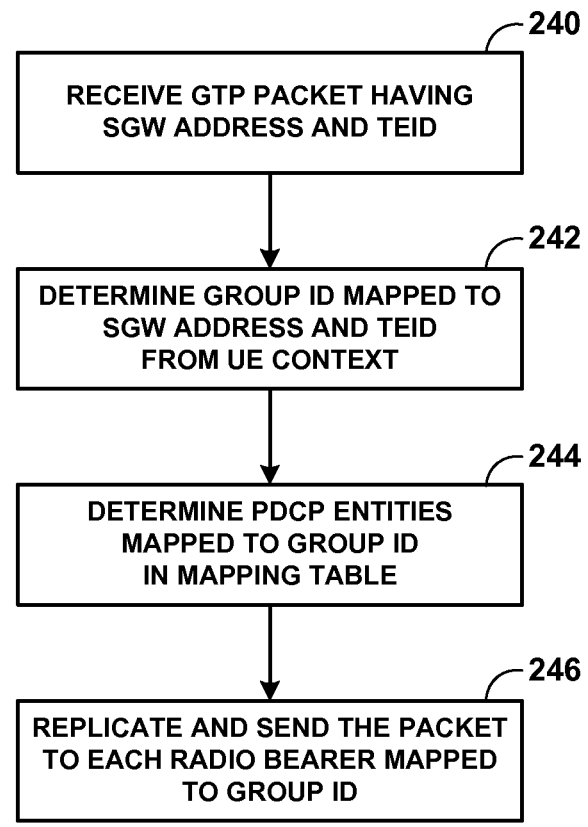
FIG. 8 is a flowchart illustrating an example mode of operation of eNB 90 of FIG. 5 for distributing collectively addressed downstream service data traffic to one or more wireless devices in accordance with the techniques herein described.

FIG. 8 is a flowchart illustrating an example mode of operation of eNB 90 of FIG. 5 for distributing collectively addressed downstream service data traffic to one or more wireless devices in accordance with the techniques herein described. SGW interface 106 of eNB 90 receives a GTP packet having a source IP address and a TEID (240). Relay module 104 determines a UE context in UE contexts 112 using the source IP address and/or TEID values and, having determined the UE context, obtains a group identity stored therein (242). The TEID may represent, for example, a downstream (eNB) TEID. Relay module 104 then queries mapping table 108 to determine one or more of PDCP entities 112 that map to the group identity (246). Relay module 104 then replicates and distributes the GTP packet payload to the determined PDCP entities for transport via respective DRBs to respective wireless devices (248).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
   establishing a service bearer, with a mobile network, based at least on a same group identity assigned to each of a plurality of wireless devices;
   associating the service bearer to a unicast packet data protocol (PDP) address in the mobile network;
   assigning the unicast PDP address to each of the plurality of wireless devices, wherein each of the plurality of wireless device is concurrently assigned the same unicast PDP address; and
   exchanging service data traffic between the plurality of wireless devices and a packet data network using the service bearer.

2. The method of claim 1, further comprising:
   receiving, with the mobile network, the group identity from each of the plurality of wireless devices.

3. The method of claim 2, wherein receiving the group identity from each of the plurality of wireless devices comprises receiving the group identity in respective attach request messages issued by the wireless devices.

4. The method of claim 2, wherein receiving the group identity from each of the plurality of wireless devices comprises receiving, with a radio access network of the mobile network, the group identity in respective connection requests issued by the wireless devices.

5. The method of claim 1, wherein establishing, with the mobile network, the service bearer based at least on the same group identity comprises:
   determining the same group identity is assigned to each of the plurality of wireless devices; and
   associating, with the mobile network, a respective bearer over a first interface for each of the plurality of wireless devices with a bearer over a second interface.

6. The method of claim 5,
   wherein the first interface is a radio interface, and
   wherein each of the respective bearers over the first interface comprises a data radio bearer.

7. The method of claim 5, wherein associating, with the mobile network, the respective bearers over the first interface for each of the plurality of wireless devices with the bearer over the second interface comprises associating a Packet Data Convergence Protocol (PDCP) entity for each of the respective bearers over the first interface with the bearer over the second interface.

8. The method of claim 5,
   wherein the first interface comprises a user plane protocol stack that includes General Packet Radio Service Tunneling Protocol-User Plane (GTP-U), and
   wherein each of the respective bearers over the first interface comprises a GTP tunnel.

9. The method of claim 5, wherein associating, with the mobile network, the respective bearer over the first interface for each of the plurality of wireless devices with the bearer over the second interface comprises:
   associating the group identity with a General Packet Radio Service Tunneling Protocol (GTP) Tunnel Endpoint Identifier (TEID) associated with the bearer over the second interface; and
   associating the group identity with the respective bearers over the first interface for each of the plurality of wireless devices.

10. The method of claim 5, wherein exchanging service data traffic between the plurality of wireless devices and the packet data network using the service bearer comprises:
    receiving, in the bearer over the second interface, downstream service data traffic destined for the unicast PDP address;
    identifying the respective bearers over the first interface for each of the plurality of wireless devices using the bearer over the second interface; and
    outputting the downstream service data traffic to each of the plurality of wireless devices in the respective bearers over the first interface for the plurality of wireless devices.

11. The method of claim 5, wherein exchanging service data traffic between the plurality of wireless devices and the packet data network using the service bearer comprises:
    receiving, in the bearers over the first interface for the plurality of wireless devices, respective upstream service data traffic from each of the plurality of wireless devices, wherein the respective upstream service data traffic is sourced with the unicast PDP address;

identifying the bearer over the second interface using the bearers over the first interface for the plurality of wireless devices; and transporting the respective upstream service data traffic in the bearer over the second interface upon identifying the bearer over the second interface.

12. The method of claim 1, wherein establishing, with the mobile network, the service bearer based at least on the same group identity comprises:

establishing a first bearer over a first interface for the service bearer when a first wireless device in the plurality of wireless devices attaches to the mobile network;

responsive to determining the same group identity is assigned to a second one of the plurality of wireless devices, tying, with the mobile network, a bearer over a second interface for the second one of the plurality of wireless devices to the first bearer to avoid establishing a second bearer over the first interface for the second one of the plurality of wireless devices.

13. A base station of a mobile network, comprising:

a context data structure to store associations for a service bearer established by the mobile network based at least on a same group identity assigned to each of a plurality of wireless devices, wherein the associations map the service bearer to sub-bearers terminated by the base station, and wherein the context data structure stores the group identity and a unicast PDP address for the plurality of wireless devices in association with the service bearer; and a relay module to relay service data traffic between each of the plurality of wireless devices and an upstream node of the mobile network using the sub-bearers mapped to the service bearer, wherein the service data traffic is associated with the unicast PDP address.

14. The base station of claim 13, further comprising:

a user equipment (UE) interface to receive the group identity from one of the plurality of wireless devices.

15. The base station of claim 13, further comprising:

a group identity associative data structure to associate the group identity with a respective sub-bearer terminated by the base station for each of the plurality of wireless devices; and a bearer setup module to receive respective context setup messages for each of the wireless devices, wherein each respective context setup message comprises the group identity, and wherein, upon receiving a context setup message for any of the wireless devices, the bearer setup module establishes a sub-bearer over a first interface for the wireless device and associates the sub-bearer over the first interface for the wireless device with a group identity in the group identity associative data structure.

16. The base station of claim 15, wherein the first interface is a radio interface, and wherein each of the respective bearers over the first interface comprises a data radio bearer.

17. The base station of claim 15, further comprising:

a respective Packet Data Convergence Protocol (PDCP) entity for each of the sub-bearers terminated by the base station for each of the plurality of wireless devices, wherein the group identity associative data structure associates the group identity with a respective sub-bearer over the first interface by associating the group identity with the PDCP entity for the respective sub-bearer over the first interface.

18. The base station of claim 15, wherein the bearer setup module receives a session setup message that includes a General Packet Radio Service Tunneling Protocol (GTP) Tunnel Endpoint Identifier (TEID) that identifies a sub-bearer over a second interface, and wherein the bearer setup module modifies the context data structure to store an association that associates the group identity with the GTP TEID associated with the sub-bearer over the second interface.

19. The base station of claim 15, further comprising:

a serving node interface to receive, in a sub-bearer over a second interface, downstream service data traffic destined for the unicast PDP address; and a UE interface, wherein the relay module determines, from the context data structure, the group identity using one or more identifiers for the sub-bearer over the second interface, wherein the relay module identifies, from the group identity associative data structure, the sub-bearers for each of the plurality of wireless devices associated with the group identity, and wherein the UE interface outputs the downstream service traffic to each of the sub-bearers identified by the relay module.

20. The base station of claim 15, further comprising:

a UE interface to receive, in a sub-bearer over a second interface, respective upstream service data traffic in the respective sub-bearers for each of the plurality of wireless devices, wherein the respective upstream service data traffic is sourced with the unicast PDP address; and a serving node interface, wherein the relay module determines, from the group identity associative data structure, the group identity for the respective sub-bearers for each of the plurality of wireless devices, wherein the relay module identifies, from the context data structure, a sub-bearer over a second interface using the group identity, wherein the serving node interface outputs the respective upstream in the sub-bearer over the second interface.

21. A mobility management entity of a mobile network comprising:

a control unit comprising a processor;

a session setup module executed by the control unit and configured to send, by a communication link with a serving node, a first message to serving node to direct the serving node to establish a first bearer over a first interface with a base station of a radio access network that is served by the serving node, wherein the session setup module receives, by the communication link with the serving node, an identifier for the first bearer in a second message from the serving node; and a bearer setup module executed by the control unit and configured to send, by a communication link with the base station, a third message to the base station, wherein the third message comprises the identifier for the first bearer and a group identity for a wireless group that includes a plurality of wireless devices served by the base station, and wherein the third message directs the base station to associate the identifier for the first bearer with the wireless group.

22. The mobility management entity of claim 21, further comprising:

a base station interface to receive the group identity from a base station; and a group identity table having entries that each map a group identity to identities for a plurality of wireless devices attached to the mobile network, wherein the bearer setup module directs the session setup module to send the first message to the serving node to direct the serving node to establish the first bearer over the first interface only when the group identity table does not include an entry for the group identity.

23. The mobility management entity of claim 21, wherein the third message directs the base station to establish a second bearer, for a first one of the plurality of wireless devices, over a second interface, wherein the bearer setup module sends a fourth message to the base station, wherein the fourth message comprises the identifier for the first bearer and the group identity, and wherein the second message directs the base station to establish a third bearer, for a second one of the plurality of wireless devices, over the second interface, and wherein the third message directs the base station to associate the identifier for the first bearer with the wireless group by associating the second bearer and third bearer to the first bearer.

24. The mobility management entity of claim 21, wherein the mobile network comprises a General Packet Radio Service (GPRS) network, and wherein the mobility management entity comprises a Radio Network Controller (RNC) of a GPRS network.

25. A system comprising:

a base station comprising:
 a User Equipment (UE) interface to establish data radio bearers with wireless devices;
 a mobility management entity (MME) interface; and
 a context data structure to store associations for a service bearer;

a plurality of wireless devices, wherein each wireless device in the plurality of wireless devices comprises:
 a group identity shared by each wireless device in the plurality of wireless devices;
 a base station interface to send the group identity to the base station;

a mobility management entity comprising:
 an MME base station interface to receive, from the wireless devices via the base station, attach request messages that includes the group identity;
 a serving node interface to receive, from a serving node, a first bearer identifier for a first bearer over a first interface between the serving node and the base station; and a bearer setup module to send, to the base station, context setup messages that include the first bearer identifier and a UE identifier for respective wireless devices, wherein the MME interface receives context setup messages and associates, in the context data structure, the service bearer, the first bearer identifier and data radio bearers for each of the plurality of wireless devices.

26. The system of claim 25, wherein the serving node interface receives, in the first bearer, service data traffic, and wherein the base station further comprises a relay module to:
 determine, from the context data structure, the data radio bearers using the first bearer identifier; and
 output the service data traffic to each of the data radio bearers.

27. The system of claim 25, wherein the UE interface receives, in first and second data radio bearers, first and second service data traffic, and wherein the base station further comprises a relay module to:
 determine, from the context data structure, the first bearer identifier using identifiers for the first and second data radio bearers; and
 output the first and second service data traffic to the first bearer.

28. The system of claim 25, wherein the system comprises a Long Term Evolution (LTE) network.

29. The system of claim 25, wherein the system comprises a General Packet Radio Service (GPRS) network.

30. A wireless group comprising a plurality of wireless devices, each of the wireless devices comprising:
 a unicast PDP address shared by the plurality of wireless devices;
 a group identity for the wireless group;
 a context data structure to map a service bearer for the wireless group to the unicast PDP address;
 a base station interface to send the group identity to a base station that serves the wireless group,
wherein the base station interface establishes a data radio bearer for the service bearer with the base station.

31. The wireless group of claim 30, wherein, for each of the wireless devices, the base station interface of the wireless device receives the unicast PDP address and maps the unicast PDP address to the data radio bearer established by the base station interface in the context data structure of the wireless device.

* * * * *